United States Patent [19]
Montjoy

[11] Patent Number: 5,934,689
[45] Date of Patent: Aug. 10, 1999

[54] CHUCK HAVING SLEEVE RETAINING NUT

[75] Inventor: Kenneth M. Montjoy, Woodruff, S.C.

[73] Assignee: Power Tool Holders, Inc., Wilmington, Del.

[21] Appl. No.: 09/024,496

[22] Filed: Feb. 17, 1998

[51] Int. Cl.⁶ .................................................. B23B 31/12
[52] U.S. Cl. ............................................ 279/62; 279/902
[58] Field of Search ................................ 279/61, 62, 902

[56] References Cited

U.S. PATENT DOCUMENTS

| | | | |
|---|---|---|---|
| 661,382 | 11/1900 | Noll | 279/62 |
| 4,067,587 | 1/1978 | Derbyshire . | |
| 4,094,523 | 6/1978 | Derbyshire . | |
| 4,840,387 | 6/1989 | McCarthy . | |
| 4,991,860 | 2/1991 | Rohm | 279/62 |
| 5,145,194 | 9/1992 | Huff et al. . | |
| 5,215,317 | 6/1993 | Jordan et al. . | |
| 5,348,317 | 9/1994 | Steadings et al. . | |
| 5,390,940 | 2/1995 | Morlino et al. . | |
| 5,553,873 | 9/1996 | Salpaka et al. . | |
| 5,816,583 | 10/1998 | Middleton | 279/62 |

FOREIGN PATENT DOCUMENTS

2757319A1 7/1979 Germany .
164059 5/1921 United Kingdom .

*Primary Examiner*—Steven C. Bishop
*Attorney, Agent, or Firm*—Dority & Manning, P.A.

[57] ABSTRACT

A chuck for use with a manual or powered driver having a drive shaft is provided. A generally cylindrical body member has a tail section and a nose section extending axially forward of a nut. The tail section is adapted to mate with the drive shaft of the driver to rotate therewith, and the nose section has an axial bore formed therein. A plurality of angularly disposed passageways are formed through the nose section and intersect the nose section axial bore. A plurality of jaws are positioned in the angularly disposed passageways, each jaw having a jaw face formed on one side thereof and threads formed on the opposite side thereof. The nut is rotatably mounted relative to the body member and has threads engaging the threads on the jaws. A generally cylindrical sleeve member is in operative communication with the nut so that the sleeve member rotationally drives the nut and so that force in the axial direction toward the nose section is transferred from the nut to the sleeve member. The sleeve member is in operative communication with the tail section to prevent axial movement of the sleeve member and the nut forward of the nose section.

21 Claims, 2 Drawing Sheets

CHUCK HAVING SLEEVE RETAINING NUT

BACKGROUND OF THE INVENTION

The present invention relates generally to chucks for use with drills or electric or pneumatic power drivers. The present invention relates to chucks of the keyed type or of the keyless type, which may be tightened or loosened by hand.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore or any other suitable means.

A variety of chuck types have been developed in which a gripping mechanism is actuated by relative rotation between a chuck body and a sleeve. In an exemplary oblique jawed chuck, for example, a body member includes three passageways disposed approximately 120° apart from each other. The passageways are configured so that their center lines meet at a point along the chuck axis forward of the chuck body. Three jaws are constrained by and movable in the passageways to grip a cylindrical tool shank disposed approximately along the chuck center axis. A nut rotates about the chuck center and engages threads on the jaws so that rotation of the nut moves the jaws in either direction in the passageways. The body is attached to the drive shaft of a driver and is configured so that rotation of the body in one direction with respect to the nut forces the jaws into gripping relationship with the tool shank, while rotation in the opposite direction releases the gripping relationship.

In a keyed chuck, a chuck key is received in a radial hole in the nose section of the body and includes teeth which engage corresponding teeth on the nut, for example, so that rotation of the key rotates the nut about the body. On the other hand, a chuck may be keyless if it is rotated by hand. One example of such a chuck is disclosed in U.S. Pat. No. 5,125,673 entitled "Non-Impact Keyless Chuck," commonly assigned to the present assignee and the entire disclosure of which is incorporated by reference herein. Various configurations of keyed and keyless chucks are known in the art and are desirable for a variety of applications.

As should be understood by those of ordinary skill in this art, the nut is typically of a one piece construction or an axially split construction. A split nut typically comprises two semi-circular halves received in a circumferential groove in the body. While the groove axially retains the nut, a mechanism must be provided to radially retain the halves in place. Such mechanism may include, for example, a sleeve member, a retaining band or a retaining band co-molded in the sleeve member. In contrast, a one piece nut is radially self-contained but generally must be axially retained with respect to the body. This is often accomplished by a retention mechanism mounted on or about the body nose section.

SUMMARY OF THE INVENTION

The present invention recognizes and address the foregoing disadvantages, and others, of prior art constructions and methods.

Accordingly, it is an object of the present invention to provide an improved chuck.

It is another object of the present invention to provide a chuck having a nut rotatably mounted relative to the chuck body and having threads engaging threads on the chuck jaws, wherein a sleeve is in communication with the nut to prevent axial movement of the nut forward of the chuck nose section.

These and other objects are achieved by a chuck for use with a manual or powered driver having a rotatable drive shaft. The chuck includes a nut and a generally cylindrical body member having a tail section and a nose section extending axially forward of the nut. The tail section is adapted to mate with the drive shaft of the driver to rotate therewith. The nose section has an axial bore formed therein and a plurality of angularly disposed passageways formed therethrough and intersecting the axial bore of the nose section. The chuck also includes a plurality of jaws disposed in the passageways, each having a jaw face formed on one side and threads formed on the opposite side. The nut is rotatably mounted relative to the body member and has threads engaging the threads on the jaws. A generally cylindrical sleeve member is in operative communication with the nut so that the sleeve member rotationally drives the nut and so that force in the axial direction toward the nose section is transferred from the nut to the sleeve member. The sleeve member is in operative communication with the tail section to prevent axial movement of the sleeve member and the nut forward of the nose section.

Other objects, features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
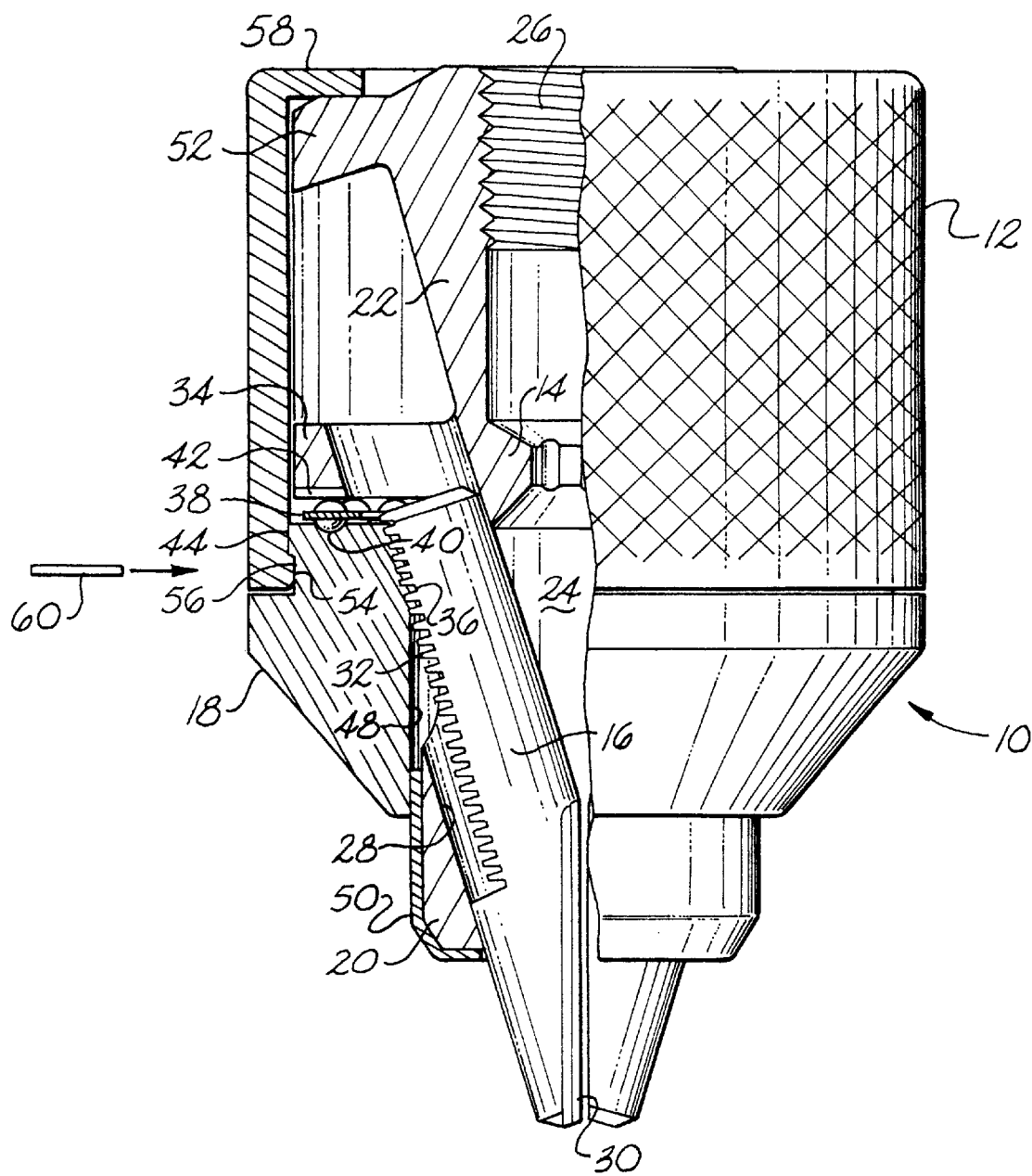
FIG. 1 is a longitudinal view, partly in section, of a chuck in accordance with an embodiment of the present invention.

Repeat use of reference characters in the present specification and drawings is intended to represent the same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
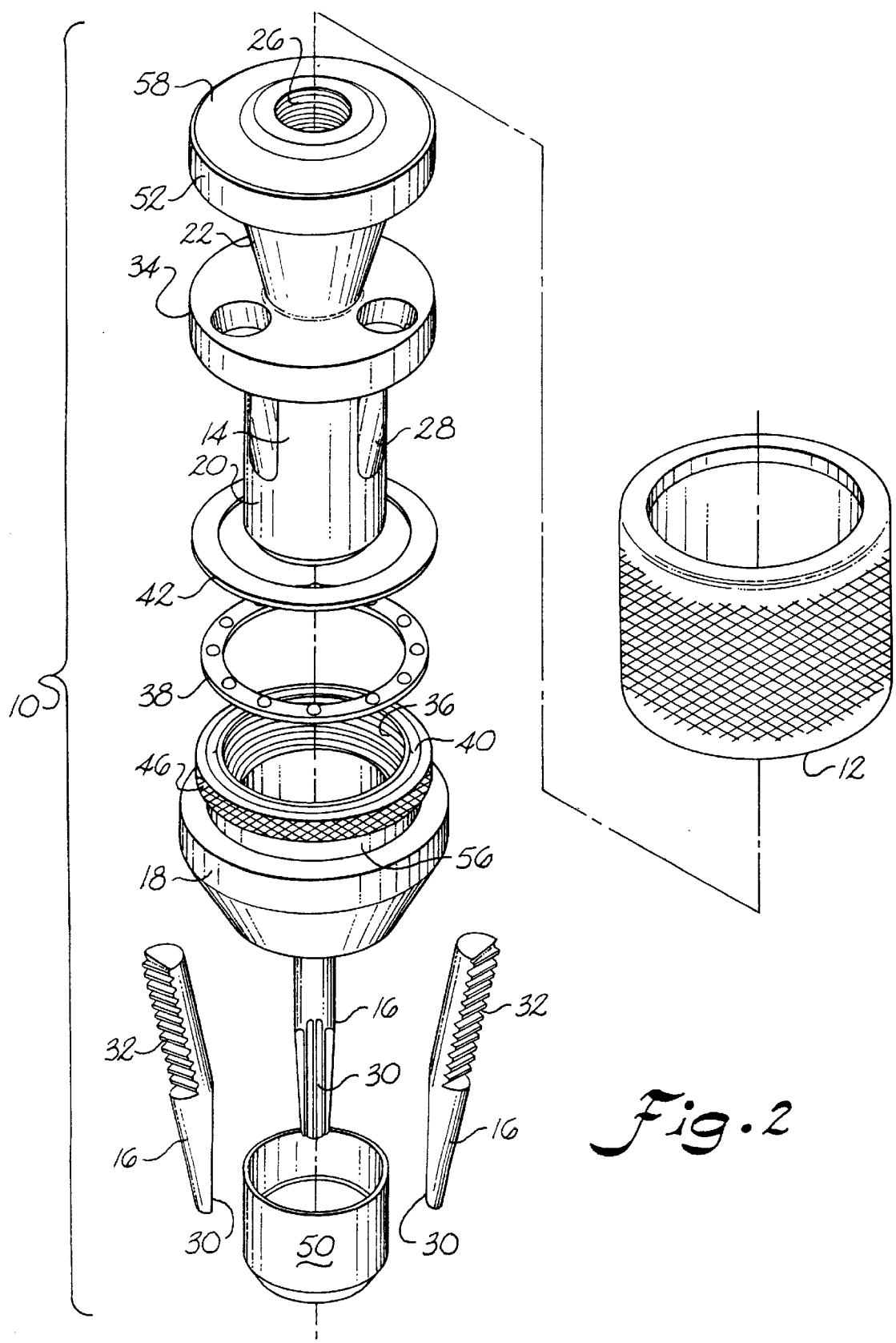
FIG. 2 is an exploded view of a chuck in accordance with an embodiment of the present invention.

Referring to FIGS. 1 and 2, a chuck 10 includes a sleeve 12, a body 14, jaws 16 and a nut 18. Body 14 is generally cylindrical in shape and comprises a nose or forward section 20 and a tail or rearward section 22. An axial bore 24 formed in the nose section is dimensioned somewhat larger than the largest tool shank the chuck is designed to accommodate. A threaded bore 26 formed in tail section 22 is of a standard size to mate with the drive shaft of a powered or hand driver, for example a power drill having a spindle (not shown). The bores 24 and 26 may communicate at a central region of body 14. While a threaded bore 26 is illustrated, such bore could be replaced with a tapered bore of a standard size to mate with a tapered drive shaft or any other suitable connection mechanism.

Passageways 28 are formed in body 14 to accommodate each jaw 16. Three jaws 16 are employed, and each jaw is separated from each adjacent jaw by an approximately 120° arc. The axes of the passageways 28 and the jaws 16 are angled with respect to the chuck axis and intersect the chuck axis at a common point ahead of chuck body 14. Each jaw 16 has a tool engaging portion 30 generally parallel to the axis of chuck body 14 and has threads 32 on its opposite or outer surface. Threads 32 may be constructed in any suitable type and pitch.

Body 14 includes a thrust ring member 34 which, in a preferred embodiment, may be integral with the body. In an alternate embodiment, thrust ring 34 may be a separate component from the body member. Three jaw guideways are formed about the circumference of thrust ring member 34 to permit retraction of the jaws therethrough.

Annular nut 18 is a one piece nut which includes threads 36 for mating with threads 32 on jaws 16. Nut 18 is positioned about the body in engagement with the jaw threads so that when the nut is rotated with respect to body 14, the jaws are advanced or retracted. A bearing assembly includes a caged roller bearing 38 disposed between nut 18 and thrust ring 34. The balls of bearing 38 roll in a circumferential track 40 on one side, and a hardened washer 42 on the other.

The outer circumferential surface of sleeve 12 may be knurled or may be provided with longitudinal ribs or any other configuration to enable a user to grip it securely. The sleeve may be fabricated from a structural plastic such as polycarbonate, a filled polypropylene, for example a glass filled polypropylene, or a blend of structural plastic materials. Other composite materials such as, for example, graphite filled polymerics may be suitable in certain environments. As should be appreciated by one skilled in the art, the materials from which the chuck's sleeve is fabricated will descend on the end use of the chuck, and the above discussion is provided by way of example only.

Sleeve 12 is attached to nut 18 by a press fit at 44. A knurled surface 46 may be provided to facilitate the press fit. The press fit permits sleeve 12 to rotationally drive nut 18, and a user gripping sleeve 12 may thereby rotate the nut in an opening direction or a closing direction to reciprocally move jaws 16 to an open position or a closed position.

When the jaws are moved in a closing direction, and particularly when the jaws grippingly engage a tool shank, nut 18 is urged rearward. The resulting force is transferred to the body through bearing 38 and thrust ring member 34. On the other hand, rotation of nut 18 in the opening direction, to move jaws 16 rearward back into passageways 28, urges the nut forward. As discussed below, this force is transferred to the body by the sleeve.

Nut 18 includes a central bore 48 having a diameter at least as large as the diameter of a nosepiece 50 pressed on nose section 20. Where no nosepiece is present, the diameter of the nut is at least as large as that of the nose section. To prevent the nut from moving forward beyond the nose section, the forward force from nut 18 is transferred to the body by sleeve 12 to an annular flange 52. Specifically, nut 18 is secured to a forward portion of sleeve 12 in the forward axial direction by the press fit described above and by the engagement of an inner circumferential ridge 54 of sleeve 12 in an outer circumferential groove 56 of nut 18. A rear portion of the sleeve is, in turn, axially secured to the body by an annular shoulder 58 that is integral with the sleeve forward section and that abuts annular flange 52. A lubricant, bearing or other suitable mechanism may be disposed between shoulder 58 and flange 52 to facilitate rotational movement therebetween.

Accordingly, forward axial force from nut 18 is transferred to sleeve 12 and, by the communication between shoulder 58 and flange 52, to body 14. Sleeve 12 thereby retains the nut in the forward axial direction, and the nut and sleeve are retained by the body tail section to prevent axial movement of the nut and sleeve beyond the body nose section.

It should be understood that various suitable mechanisms may be employed to secure nut 18 in the forward axial direction with respect to sleeve 12. For example, an outer circumferential ridge may be disposed on nut 18 that is received in a corresponding inner circumferential groove in sleeve 12. Furthermore, the circumferential ridge, either of the nut or the sleeve, may be continuous or segmented, and the nut and sleeve may be joined by a castled interface. The sleeve may also be staked to the nut, for example by a plurality of pins 60 extending radially through sleeve 12 into nut 18. Still further, the nut and sleeve may be joined by rolling or orbital riveting arrangements. Moreover, it should be understood that any of these or other suitable mechanisms may be used alone or in any suitable combination. Thus, the sleeve and nut may be joined by press fit alone. Similarly, the rear sleeve and body may communicate by various suitable interfaces, for example by an annular ridge of one received by an annular groove of the other.

While one or more preferred embodiments of the present invention are described above, it should be appreciated that various suitable embodiments are encompassed by the present invention. Accordingly, such modifications and variations to the present invention may be practiced by those of ordinary skill in the art without parting from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is provided by way of example only, and is not intended to limit the invention so further described in such appended claims.

What is claimed is:

1. A chuck for use with a manual or powered driver having a rotatable drive shaft, said chuck comprising:

a nut;

a generally cylindrical body member having a tail section and a nose section extending axially forward of said nut, said tail section being adapted to mate with said drive shaft of said driver to rotate therewith and said nose section having an axial bore formed therein and a plurality of angularly disposed passageways formed therethrough and intersecting said axial bore of said nose section;

a plurality of jaws, a separate one of said jaws being slidably positioned in one of each of said angularly disposed passageways, each of said jaws having a jaw face formed on one side thereof and threads formed on the opposite side thereof, wherein said nut is rotatably mounted relative to said body member and has threads engaging said threads on said jaws;

a generally cylindrical sleeve member separate from and in operative communication with said nut so that said sleeve member rotationally drives said nut and so that force in the axial direction toward said nose section is transferred from said nut to said sleeve member; and an annular thrust ring axially fixed to said body and extending radially outward therefrom, said thrust ring being in operative communication with said nut to receive rearward axial force therefrom, wherein said tail section includes an annular flange, wherein said sleeve member includes a rear portion and a forward portion nonthreadedly attached to said rear portion, and wherein said rear portion includes an annular shoulder having a forward face engaging a rearward face of said annular flange to prevent axial movement of said sleeve member and said nut forward of said nose section.

2. A chuck as in claim 1, wherein said nut is a one piece nut.

3. A chuck as in claim 1, wherein said nut includes an exposed surface axially forward of said sleeve member.

4. A chuck as in claim 1, wherein said nut includes a central bore axially forward of said nut threads, said nut central bore having an inner diameter greater than the outer diameter of said nose section of said body to permit said nose section to be received through said bore.

5. A chuck as in claim 4, wherein said nut central bore is a generally cylindrical bore.

6. A chuck as in claim 4, including a nosepiece pressed to said nose section of said body, and wherein said inner diameter of said nut central bore is greater than the outer diameter of said nosepiece.

7. A chuck as in claim 1, wherein said thrust ring is constructed integrally with said body.

8. A chuck as in claim 1, including a bearing assembly disposed between said nut and said thrust ring to facilitate rotational movement of said nut relative to said thrust ring.

9. A chuck as in claim 1, wherein said nut has an outer circumferential groove and wherein said sleeve member has an inner circumferential ridge received by said groove to prevent rearward axial movement of said sleeve member with respect to said nut.

10. A chuck as in claim 9, wherein said inner circumferential ridge is continuous.

11. A chuck as in claim 1, including at least one pin extending radially, with respect to said body, through said sleeve member and into said nut to prevent rearward axial movement of said sleeve member with respect to said nut.

12. A chuck as in claim 1, wherein said sleeve member is pressed to said nut.

13. A chuck as in claim 1, wherein said forward face of said annular shoulder abuts said rearward face of said annular flange.

14. A chuck as in claim 1, wherein said sleeve is integrally constructed from said nut through said rear portion of said sleeve.

15. A chuck for use with a manual or powered driver having a rotatable drive shaft, said chuck comprising:

a nut;

a generally cylindrical body member having a tail section and a nose section extending axially forward of said nut, said tail section being adapted to mate with said drive shaft of said driver to rotate therewith and said nose section having an axial bore formed therein and a plurality of angularly disposed passageways formed therethrough and intersecting said axial bore of said nose section;

a plurality of jaws, a separate one of said jaws being slidably positioned in one of each of said angularly disposed passageways, each of said jaws having a law face formed on one side thereof and threads formed on the opposite side thereof, wherein said nut is rotatable mounted relative to said body member and has threads engaging said threads on said jaws, and wherein said nut includes a central bore axially forward of said nut threads, said nut central bore having an inner diameter greater than the outer diameter of said nose section of said body to permit said nose section to be received through said bore;

a generally cylindrical sleeve member in operative communication with said nut so that said sleeve member rotationally drives said nut and so that force in the axial direction toward said nose section is transferred from said nut to said sleeve member, said sleeve member also being in operative communication with said tail section to prevent axial movement of said sleeve member and said nut forward of said nose section; and a nosepiece pressed to said nose section of said body, wherein said inner diameter of said nut central bore is greater than the outer diameter of said nosepiece and wherein said nut is disposed about at least a portion of said nosepiece.

16. A chuck for use with a manual or powered driver having a rotatable drive shaft, said chuck comprising:

a generally cylindrical body member having a nose section and a tail section, said tail section being adapted to mate with said drive shaft of said driver to rotate therewith and said nose section having an axial bore formed therein and a plurality of angularly disposed passageways formed therethrough and intersecting said axial bore of said nose section;

a plurality of jaws, a separate one of said jaws being slidably positioned in one of each of said angularly disposed passageways, each of said jaws having a jaw face formed on one side thereof and threads formed on the opposite side thereof;

a nut rotatably mounted relative to said body member, having threads engaging said threads on said jaws, and having a central bore axially forward of said nut threads, said nut central bore having an inner diameter greater than the outer diameter of said nose section of said body to permit said nose section to be received through said nut central bore;

a generally cylindrical sleeve member separate from and in operative communication with said nut so that said sleeve member rotationally drives said nut and so that said sleeve member is axially fixed to said nut, said sleeve member having a forward portion and a rear portion integrally constructed with said forward portion; and an annular thrust ring axially fixed to said body and extending radially outward therefrom, said thrust ring being in operative communication with said nut to receive rearward axial force therefrom, wherein said tail section includes an annular flange and wherein said rear portion includes an annular shoulder having a forward face engaging a rearward face of said annular flange to prevent axial movement of said sleeve member and said nut forward of said nose section.

17. A chuck for use with a manual or powered driver having a rotatable drive shaft, said chuck comprising:

a generally cylindrical body member having a nose section and a tail section, said tail section being adapted to mate with said drive shaft of said driver to rotate therewith and having an annular flange, and said nose section having an axial bore formed therein and a plurality of angularly disposed passageways formed therethrough and intersecting said axial bore of said nose section;

a plurality of jaws, a separate one of said jaws being slidably positioned in one of each of said angularly disposed passageways, each of said jaws having a jaw face formed on one side thereof and threads formed on the opposite side thereof;

a nut rotatably mounted relative to said body member, having threads engaging said threads on said jaws, and having a central bore axially forward of said nut threads, said nut central bore having an inner diameter greater than the outer diameter of said nose section of said body to permit said nose section to be received through said nut central bore;

a generally cylindrical sleeve member in operative communication with said nut so that said sleeve member rotationally drives said nut and so that said sleeve member is axially fixed to said nut, said sleeve member having a rear portion engaging said annular flange of said tail section of said body to prevent axial movement of said sleeve member and said nut forward of said nose section; and a nosepiece pressed to said nose section of said body, wherein said inner diameter of said nut central bore is greater than the outer diameter of said nosepiece and wherein said nut is disposed about at least a portion of said nosepiece.

18. A chuck as in claim 17, including an annular thrust ring axially fixed to said body and extending radially outward therefrom, said thrust ring being in operative communication with said nut to receive rearward axial force therefrom.

19. A chuck as in claim 17, wherein said sleeve member is pressed to said nut.

20. A chuck as in claim 17, wherein said nut has an outer circumferential groove and wherein said sleeve member has an inner circumferential ridge received by said groove.

21. A chuck as in claim 17, including at least one pin extending radially, with respect to said body, through said sleeve and into said nut.

* * * * *

UNITED STATES PATENT AND TRADEMARK OFFICE
CERTIFICATE OF CORRECTION

PATENT NO. : 5,934,689
DATED : August 10, 1999
INVENTOR(S) : KENNETH M. MONTJOY

It is certified that error appears in the above-identified patent and that said Letters Patent is hereby corrected as shown below:

Column 3, line 45 change "descend" to --depend--.
Column 6, line 7 change "law" to --jaw--.

Signed and Sealed this

Seventeenth Day of April, 2001

Attest:

NICHOLAS P. GODICI

Attesting Officer      *Acting Director of the United States Patent and Trademark Office*